(12) United States Patent  (10) Patent No.: US 8,332,739 B2
Shima et al.  (45) Date of Patent: Dec. 11, 2012

(54) PRINTER DRIVER PROGRAM, PRINT CONTROL APPARATUS AND PRINT CONTROL METHOD

(75) Inventors: Shuichi Shima, Suwa (JP); Nobukiyo Tanaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 271 days.

(21) Appl. No.: 12/606,995

(22) Filed: Oct. 27, 2009

(65) Prior Publication Data

US 2010/0107065 A1   Apr. 29, 2010

(30) Foreign Application Priority Data

Oct. 28, 2008   (JP) ................................. 2008-276428

(51) Int. Cl.
*G06F 17/00*   (2006.01)
(52) U.S. Cl. ....................................... 715/200
(58) Field of Classification Search .................. 715/200, 715/274
See application file for complete search history.

(56) References Cited

U.S. PATENT DOCUMENTS

| | | | |
|---|---|---|---|
| 6,484,204 B1 * | 11/2002 | Rabinovich | 709/226 |
| 6,891,632 B2 * | 5/2005 | Schwartz | 358/1.15 |
| 7,136,941 B2 * | 11/2006 | Nguyen et al. | 710/15 |
| 7,756,810 B2 * | 7/2010 | Nelken et al. | 706/60 |
| 7,814,417 B2 * | 10/2010 | Tomita et al. | 715/273 |
| 7,903,282 B2 * | 3/2011 | Furukawa et al. | 358/1.9 |
| 2002/0097432 A1 * | 7/2002 | Kumashio | 358/1.15 |
| 2003/0217132 A1 * | 11/2003 | Batten et al. | 709/223 |
| 2005/0094200 A1 * | 5/2005 | Uekusa et al. | 358/1.15 |
| 2005/0210381 A1 * | 9/2005 | Rethore et al. | 715/525 |
| 2006/0092467 A1 * | 5/2006 | Dumitrescu et al. | 358/1.15 |
| 2006/0101091 A1 * | 5/2006 | Carbajales et al. | 707/202 |
| 2006/0106683 A1 * | 5/2006 | Fisher et al. | 705/27 |
| 2006/0111928 A1 * | 5/2006 | Fisher et al. | 705/1 |
| 2006/0143593 A1 * | 6/2006 | Caffrey et al. | 717/120 |
| 2007/0165248 A1 * | 7/2007 | Utsunomiya et al. | 358/1.1 |
| 2007/0226255 A1 * | 9/2007 | Anderson | 707/104.1 |
| 2008/0077914 A1 * | 3/2008 | Sando | 717/174 |
| 2008/0168034 A1 * | 7/2008 | Tsuchiya | 707/3 |
| 2008/0307346 A1 * | 12/2008 | Turski et al. | 715/769 |
| 2009/0040558 A1 * | 2/2009 | Schwier | 358/1.15 |
| 2010/0333035 A1 * | 12/2010 | Yoshida | 715/835 |
| 2011/0083137 A1 * | 4/2011 | Kashioka | 719/315 |
| 2011/0231401 A1 * | 9/2011 | Bocking et al. | 707/740 |

FOREIGN PATENT DOCUMENTS

| | | |
|---|---|---|
| JP | 2000-298562 A | 10/2000 |
| JP | 2003-316539 A | 11/2003 |
| JP | 2006-285968 A | 10/2006 |
| JP | 2007-279894 A | 10/2007 |

OTHER PUBLICATIONS

Yamamoto et al., FDT/DTM Framework for Field Device Integration, Google 2008, pp. 925-928.*

* cited by examiner

*Primary Examiner* — Cong-Lac Huynh
(74) *Attorney, Agent, or Firm* — Kilpatrick Townsend & Stockton LLP (57) ABSTRACT

A storage medium has a printer driver program recorded thereon causing a computer to execute functions including a category-based UI information managing function that manages UI information on a display of a user interface to set a print condition, for every category, to which an application program of a print instruction source belongs, a print condition display control function that displays the user interface based on the UI information corresponding to the category, to which the application program of the print instruction source belongs, when printing is instructed, and a UI information editing function that edits the UI information to be managed for every category.

10 Claims, 6 Drawing Sheets

FIG. 2

| IDENTIFIER OF CATEGORY | IDENTIFIER OF APPLICATION | PASS TO UI INFORMATION |
|---|---|---|
| BUSINESS DOCUMENT PREPARATION SYSTEM | A COMPANY - WORD PROCESSOR APPLICATION | ○○△△□1 |
| | A COMPANY - TABLE CALCULATION APPLICATION | ○○△△□2 |
| | A COMPANY - PRESENTATION APPLICATION | |
| IMAGE RETOUCH SYSTEM | B COMPANY - IMAGE RETOUCH APPLICATION | ○○△△□3 |
| POSTCARD PRINT SYSTEM | C COMPANY - POSTCARD PRINT APPLICATION | — |
| CAD SYSTEM | — | |
| WEB BROWSER SYSTEM | A COMPANY - BROWSER | ○○△△□4 |
| | D COMPANY - BROWSER | |

PRINTER DRIVER PROGRAM, PRINT CONTROL APPARATUS AND PRINT CONTROL METHOD

This application claims priority to Japanese Patent Application No. 2008-276428, filed Oct. 28, 2008, the entirety of which is incorporated by reference herein.

BACKGROUND

1. Technical Field

The present invention relates to a printer driver program providing a user interface for performing various print settings, a print control apparatus and a print control method.

2. Related Art

In recent years, a technique is known to change items for setting print conditions, which are displayed on a user interface, in accordance with the frequency in use of the items when a user utilizing a computer performs printing by using a printer connected to the computer. JP-A-2007-279894 is an example of related art, in which the items less frequently used by users are not displayed, and the items more frequently used are displayed.

In the publication JP-A-2007-279894, however, it is not possible to change the user interface of a printer driver in accordance with a category classifying an application program as a print instruction source. As an example of various categories which classify the application programs, there are a word processor system, an image retouch system, and so on. Even though the user is the same, the items, of which the setting is frequently changed whenever printing, are different in accordance with the application program used. For example, in the case where printing is instructed from an application program of the word processor system, it would appear that items, such as allocation of print selection, double-sided/one-side print selection or the like, are frequently changed. Further, for example, in the case where printing is instructed from an application program of the image retouch system, it would appear that items, such as paper selection, image quality selection or the like, are frequently used, instead that the application print selection or the double-sided/one-side print selection is not so utilized.

SUMMARY

An advantage of some aspects of the invention is to provide a technique of changing a user interface of a printer driver program in accordance with a category of an application program used.

In order to achieve the above object, a printer driver program includes a category-based UI information managing function that manages UI information on a display of a user interface to set a print condition, for every category, to which an application program of a print instruction source belongs, and a print condition display control function that displays the user interface based on the UI information corresponding to the category, to which the application program of the print instruction source belongs, when printing is instructed.

According to the printer driver program, the user interface for setting the print condition can be displayed in a mode corresponding to the category to which the application program belongs. For this reason, the usability of the item, of which the frequency in use is different depending upon the category to which the application program belongs, can be improved as compared with a configuration of a prior art which displays the item on the same user interface even though the category is different. Also, according to the printer driver program, a different application program belonging to the same category utilizes the same user interface, and in the case of belonging to another category, utilizes other user interface. Therefore, as compared with the configuration which manages the user interface for every application program, it is possible to prevent an amount of information to be managed from being unnecessarily increased.

The UI information includes information for indicating print condition setting items (e.g., selection of paper size or selection of paper type) displayed on a print condition setting window or information for defining a type, arrangement, and size of GUI widget corresponding to the item, action when the GUI widget is operated, or the like. Also, the category means a group providing a common interface for setting the print condition. The invention is not limited to a concrete aspect of the category, and a category such as a word processor system, an image retouch system or the like may be supposed.

In order to achieve the above object, the printer driver program may include a UI information for editing function that edits the UI information to be managed for every category. Therefore, the user can customize the user interface for every category of the application program. For example, the user can select the print condition setting item to be displayed on the window or change the layout of the GUI widget corresponding to the selected item. For this function, the user can edit the user interface for his or her convenience to a desired category, for example, by displaying the items more frequently used at a position, size or order which can allow the user conveniently to operate the items as compared with the item less frequently used.

In order to achieve the above object, the printer driver program may include an application allocating function that allocates the application program to the category. For this function, the user can allocate a certain application program installed in his or her computer. As a result, it is possible to display the print condition setting on the user interface in the mode corresponding to the category.

In order to achieve the above object, the printer driver program may include a category editing function that edits the category. For this function, the user can add a new category, or delete or change the existing category.

With the user interface provided by the printer driver program according to the invention, the technique of changing the user interface in accordance with the category of the application program for the print instruction source may be applied as an apparatus or method for implementing the technique. The printer driver program and method may be realized by a single apparatus or a combination of a plurality of apparatuses, and include various aspects. The printer drive program and method may be changed in a suitable manner, for example, in which one portion is software and the other portion is hardware. Further, the invention can be realized as a recording medium for recording the printer driver program. Of course, the recording medium may be a magnetic recording medium or a magneto-optical recording medium, and can be considered with respect to any recording mediums which can be developed in future, in a similar manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
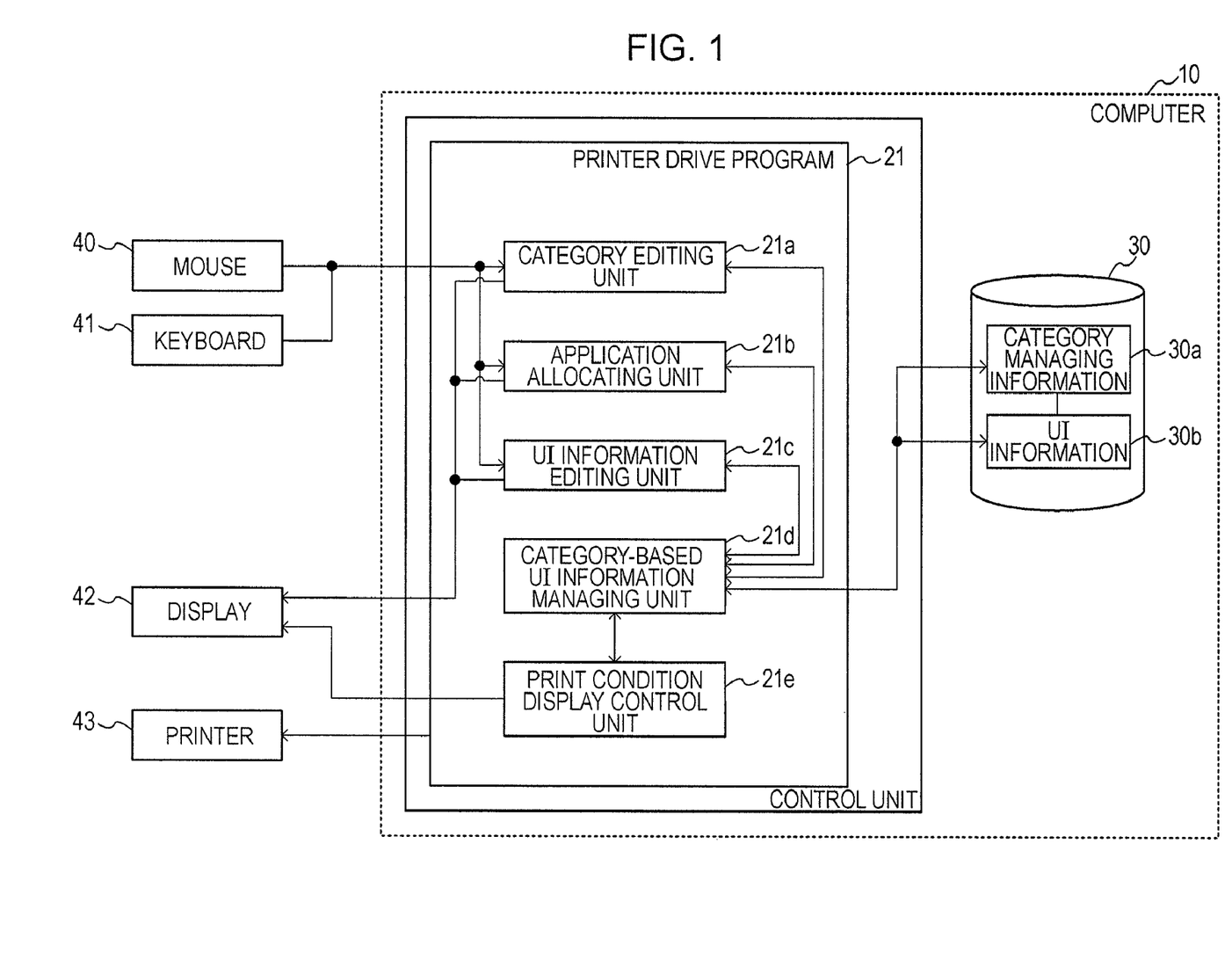
FIG. 1 is a block diagram showing a printer driver program and a computer for executing the printer driver program.

An embodiment of the invention will now be described in the order below.
(1) Configuration of print control apparatus
(2) Exemplary operation
(3) Other embodiments
(1) Configuration of Print Control Apparatus FIG. 1 is a block diagram showing the configuration of a computer 10 serving as a print control apparatus according to the invention. The computer 10 includes a control unit 20 having RAM, ROM, CPU, and so on, and programs installed in the ROM or a hard disc 30 are executed by the control unit 20. In this embodiment, the control unit 20 can execute various application programs (hereinafter merely referred to as "application") and a printer driver program 21 (hereinafter merely referred to as "a printer driver"). The printer driver 21 has several functions, such as a function of changing a user interface for every category of the applications.

The computer 10 is electrically connected to input/output devices such as a mouse 40, a keyboard 41, a display 42, and so on via an interface not shown in the drawings. Also, the computer 10 is electrically connected to a printer 43 via an interface which is not shown. If execution of printing is instructed from various applications installed in the computer 10, the printer driver 21 displays the user interface for setting print conditions or the like on the display 42, and receives an instruction to set the print conditions or the like from a user.

The printer driver 21 includes a category editing unit 21a, an application allocating unit 21b, a UI information editing unit 21c, a category-based UI information managing unit 21d, and a print condition display control unit 21e, in order to perform the function of changing the user interface for every category of the applications. The UI information may be information for indicating print condition setting items to be displayed on a print condition setting window or information for defining a type, arrangement, and size of a GUI widget corresponding to the item, action when the GUI widget is operated, or the like. Also, the category means a group providing a common interface for setting the print conditions. In this embodiment, the category such as a business document preparation system, an image retouch system, a card print system, a CAD system, or a web browser system is used.

The category editing unit 21a is a module for causing the control unit 20 to realize a function of editing the category. The category editing unit 21a has a function of providing a user with a user interface to input the addition of a new category or the deletion and change of the existing category, and a function of inputting information displaying operation contents of a user via the user interface.

Figure 2:
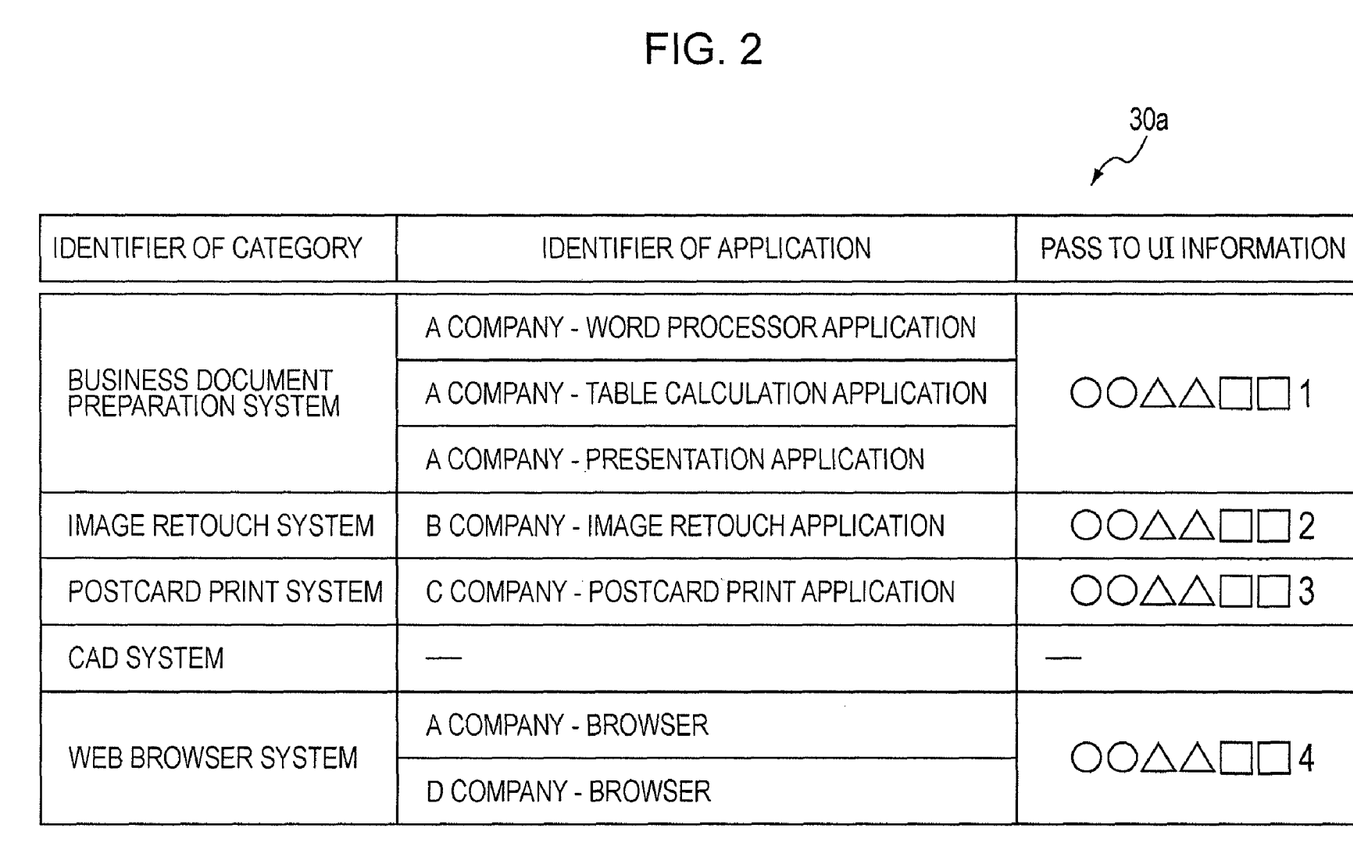
FIG. 2 is a view explaining category managing information.

The application allocating unit 21b is a module for causing the control unit 20 to realize a function of allocating the application to the category. The application allocating unit 21b has a function of providing a user with a user interface to select an application to be allocated to a category or select an application to be released from the allocation, and a function of inputting information displaying the selection of a user via the user interface. A plurality of applications may be allocated to one category, but a category to which one application belongs is unique. FIG. 2 shows one example of an application allocated to a category. A category managing information 30a including allocation information of the application shown in FIG. 2 is stored in the hard disc 30, and can be referenced and rewritten by the printer driver 21.

The UI information editing unit 21c is a module for causing the control unit 20 to realize a function of editing the UI information to be managed for every category. The UI information editing unit 21c has a function of providing a user with a user interface to select a print condition setting item displayed on a print condition setting window, changing a layout of the GUI widget of the selected item, or changing an initial value of the GUI widget, and a function of inputting the information displaying the contents edited by the user via the user interface. The UI information includes an identifier of a print condition setting item (e.g., selection of a paper size or selection of a paper type) displayed on a print condition setting window, layout information or initial value of the GUI widget (e.g., radio button, check box, drop-down list, or text representing the print condition setting items) corresponding to the identifier, pass information to a program module defining action when the GUI widget is operated, and so on. The UI information 30b is stored in the hard disc 30, and can be referenced or rewritten by the printer driver 21. The category managing information 30a shown in FIG. 2 indicates the pass information to the UI information 30b for every category. The image data of the GUI widget is stored in the hard disc 30.

The category-based UI information managing unit 21d is a module for causing the control unit 20 to realize a function of managing UI information on the display of the user interface for setting the print condition for every category to which the application of a print instruction source belongs. More specifically, the category-based UI information managing unit 21d transfers the category managing information 30a or the UI information 30b in accordance with the demand of the category editing unit 21a, the application allocating unit 21b or the UI information editing unit 21c. Further, the category-based UI information managing unit 21d updates the contents of the category managing information 30a or the UI information 30b in accordance with the demand for updating the information from the category editing unit 21a, the application allocating unit 21b or the UI information editing unit 21c.

The print condition display control unit 21e is a module for causing the control unit 20 to realize a function of displaying the user interface based on the UI information corresponding to the category to which the application of the print instruction source belongs, when the printer 43 is instructed to perform printing from the application installed in the computer 10. The print condition display control unit 21e notifies the category-based UI information managing unit 21d of the identifier of the application of the print instruction source, when the print condition display control unit 21e receives the print instruction from the application. The category-based UI information managing unit 21d references the category managing information 30a, and transfers the UI information 30b corresponding to the category, to which the application belongs, to the print condition display control unit 21e from the identifier of the application.

Based on the print condition set by the user via the user interface which is displayed on the display 42 by the processing of the print condition display control unit 21e, the printer driver 21 converts the image data of the object to be printed which is obtained from the application, into the print data to allow the printer 43 to execute the printing and transfers the converted image data to the printer 43.

The printer 43 is a printer of ink jet type including a carrying unit having a carrying mechanism for carrying a printing medium, a carriage reciprocating in a direction vertical to a carrying direction, ink cartridges mounted on the carriage and each having color ink, and a print head. If the printer 43 receives the print data from the computer 10, the printer 43 drives the carriage and the carrying unit to form an image on the printing medium. The printer 43 may be a printer which carries out the printing in another manner.

(2) Exemplary Operation

Figure 3A:
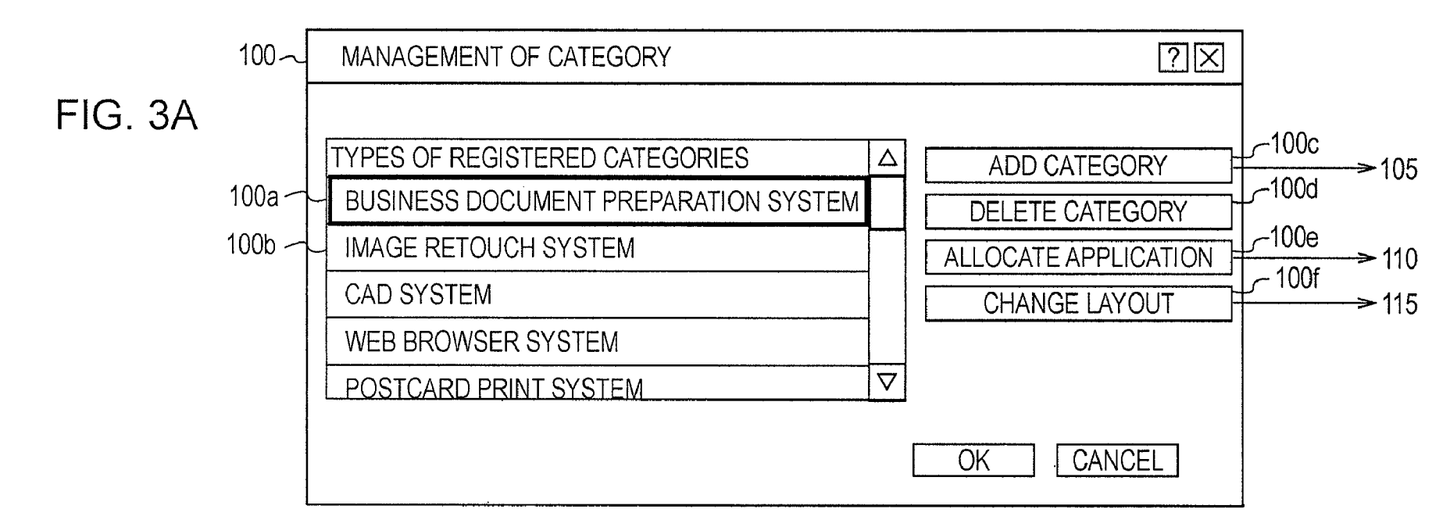
FIGS. 3A to 3C are views showing an example of a user interface provided by the printer driver program.
Figure 3B:
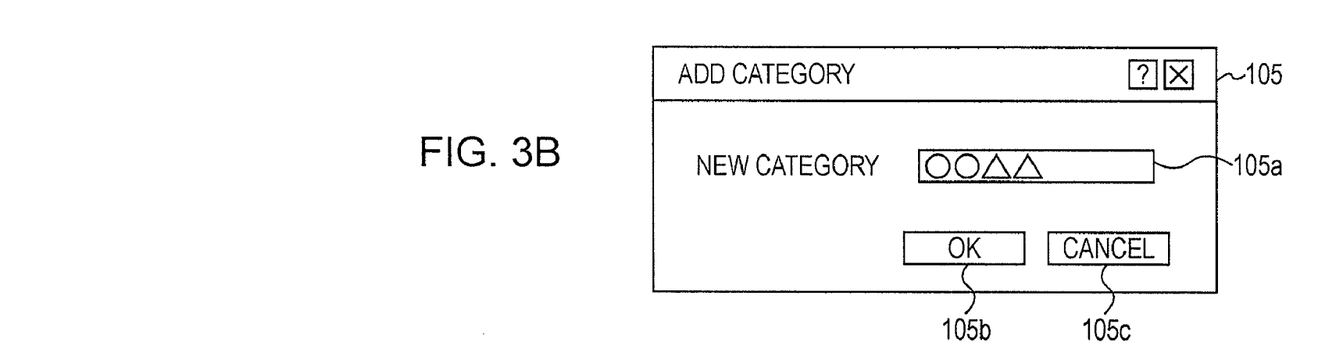
Figure 3C:
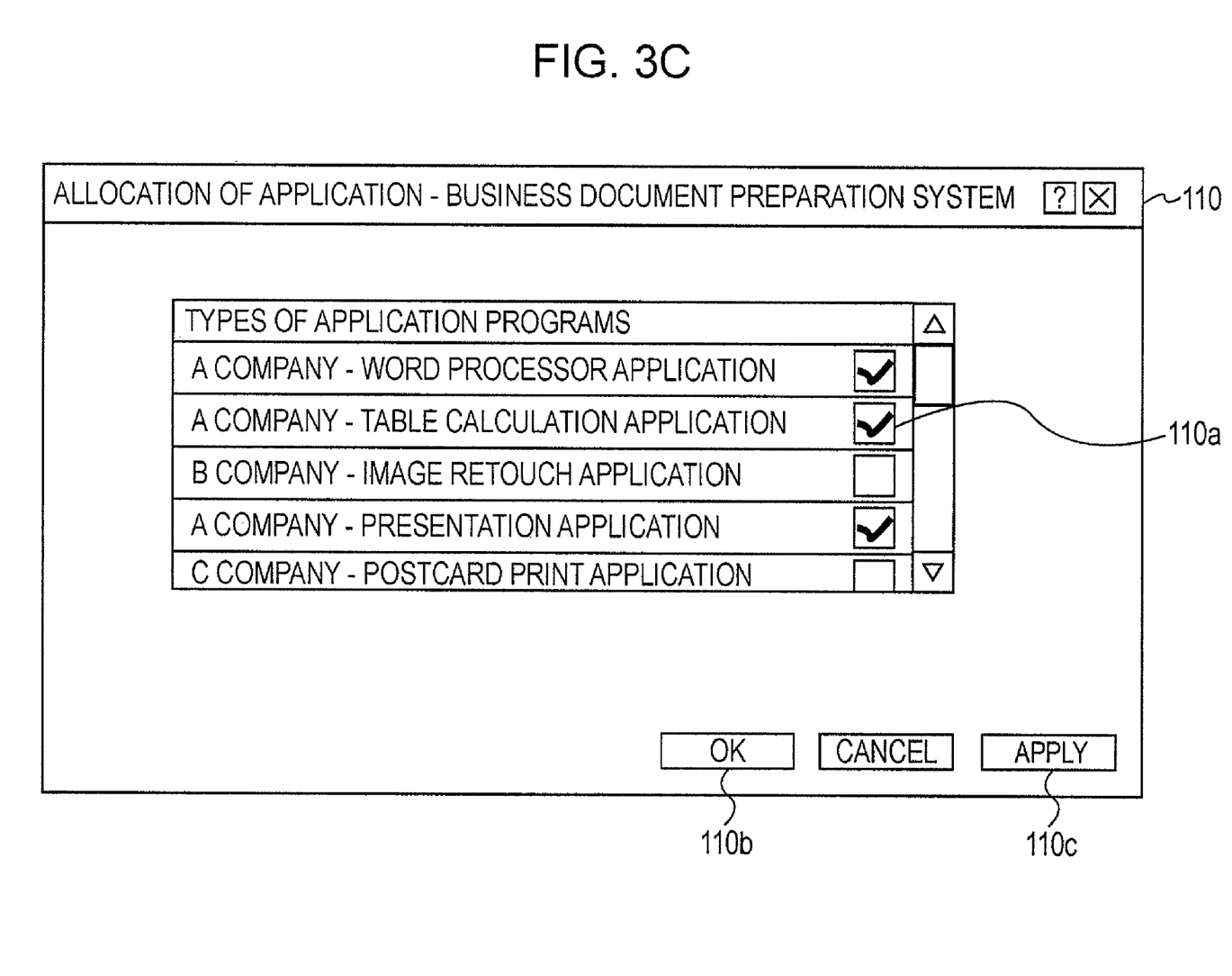
Figure 4A:
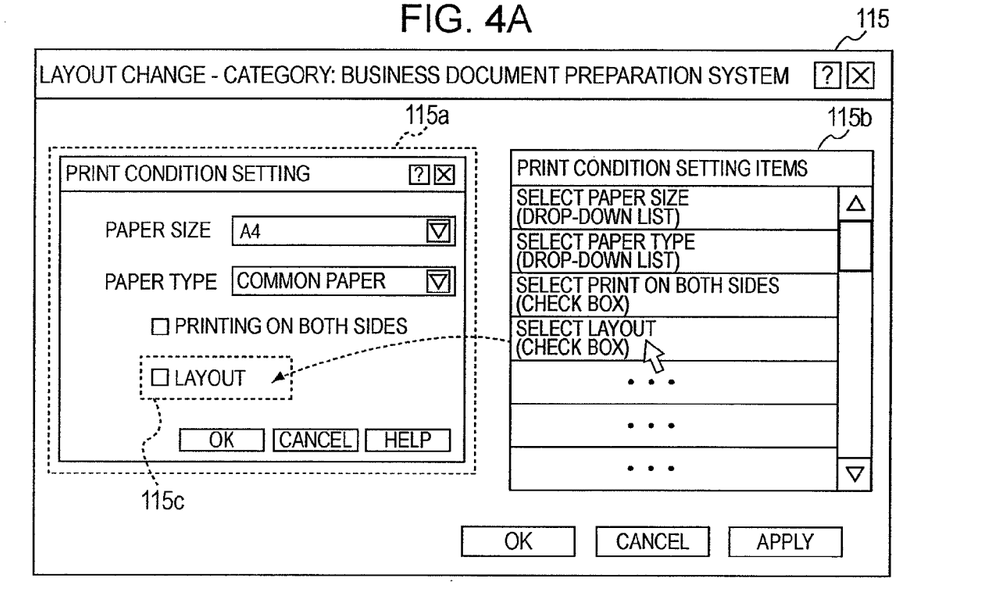
FIGS. 4A and 4B are views showing an example of a user interface provided by the printer driver program.
Figure 4B:
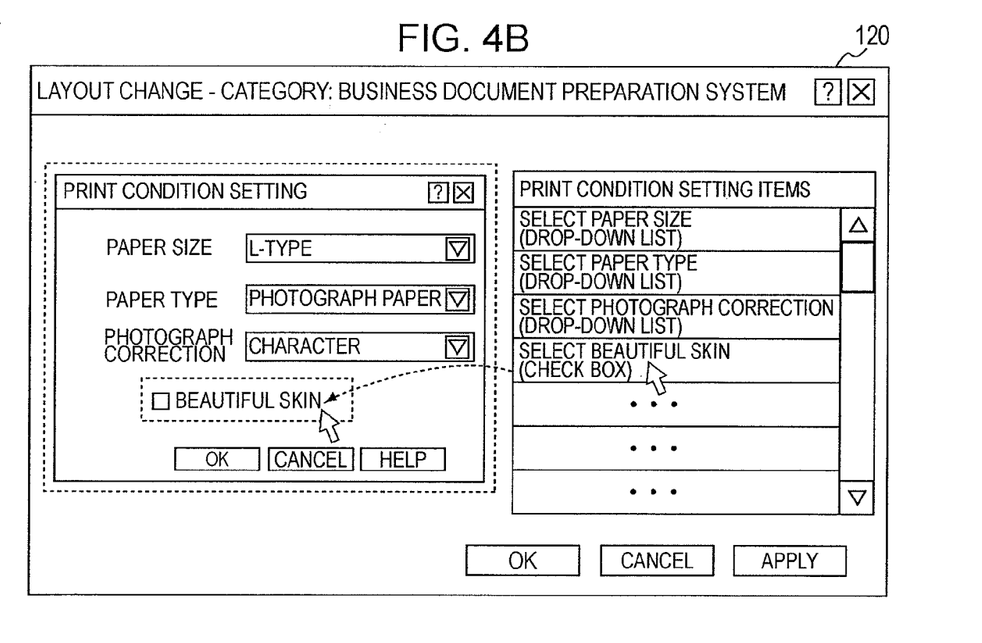
Figure 5A:
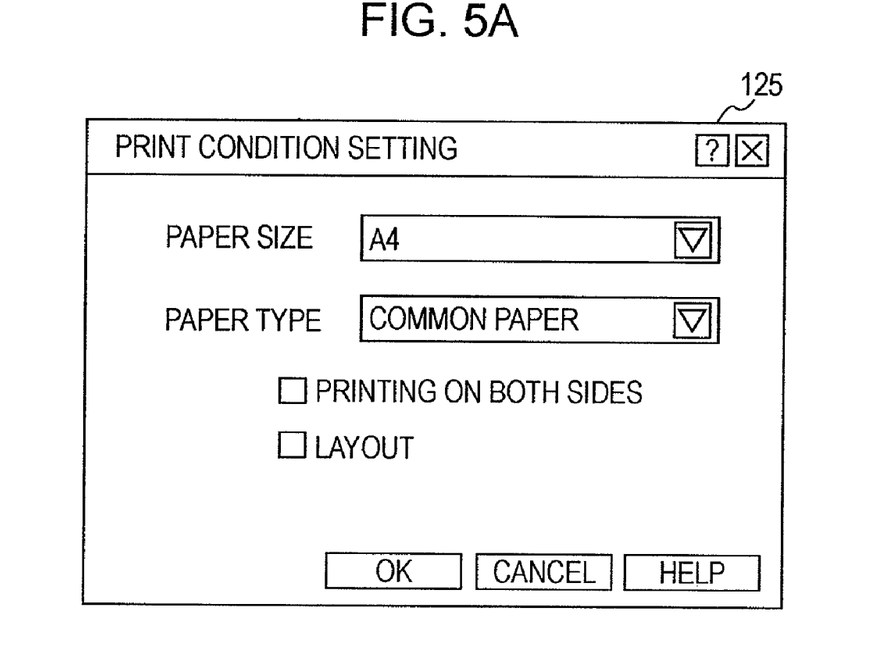
FIGS. 5A and 5B are views showing an example of a user interface provided by the printer driver program.
Figure 5B:
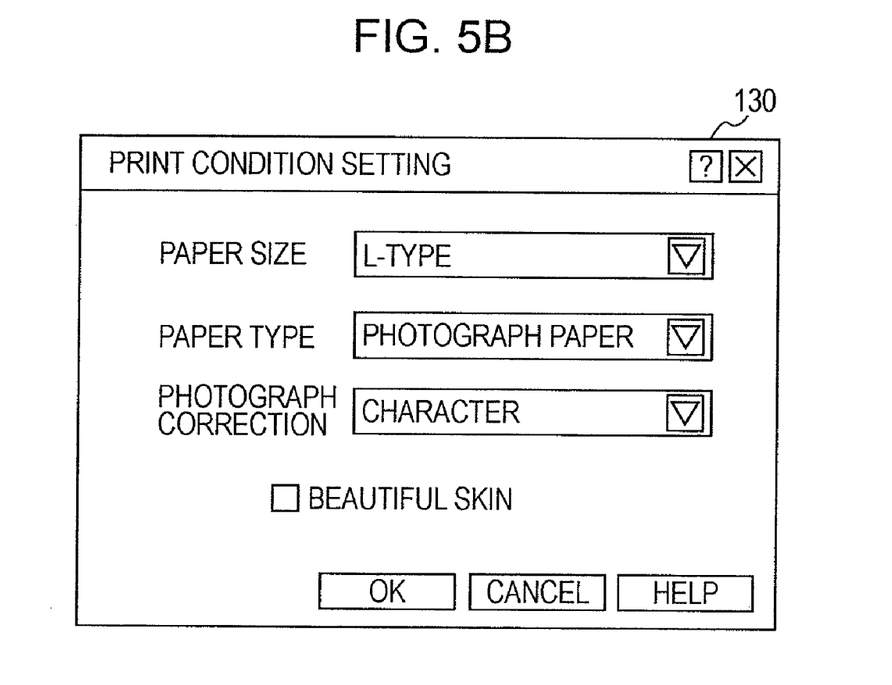

An exemplary operation of the printer driver 21 described above will now be described with reference to FIGS. 3 to 5. FIGS. 3 to 5 schematically show the user interface provided by the printer driver 21, and show examples of a window displayed on the display 42 by process of each units of the printer driver 21.

The "management of category" window 100 shown in FIG. 3A is a window for allowing the user to select the displayed category of the operational object, or a type of operational object (there may be an operation in which it is not necessary to select the category of the operational object) for the category of the operational object. Therefore, the window 100 presents the user with a view of types of the categories which are currently registered. For example, a business document preparation system, an image retouch system, a CAD system, a WEB browser system, and a postcard preparation system are presented. The "business document preparation system" category 100a which is currently selected is highlighted from other categories. Also, "add category", "delete category", "allocate application" and "layout change", which are types of operation, may be selected on the window 100.

If the user operates the "add category" button 100c in the state in which the "management of category" window 100 is displayed, the control unit 20 displays the "add category" window 105 shown in FIG. 3B by the processing of the category editing unit 21a. The window 105 is a window to allow the user to input a name of a new category so as to add the new category. The user can input the name of the new category in a text box 105a by operating, for example, a keyboard, in the state where the "add category" window 105 is activated. If an "OK" button 105b is operated, the control unit 20 adds the name of the new category, which is input by the user, in the "identifier of the category" of the category managing information 30a shown in FIG. 2, through the processing of the category-based UI information managing unit 21d, and then deletes the "add category" window 105. If a "cancel" button 105c is operated, the control unit 20 deletes the window 105 without performing addition of the category.

In the state where the "management of category" window 100 is displayed and, for example, "business document preparation system" category 100a is selected, if the "delete category" button 100d is operated, the control unit 20 displays, for example, a dialog box (not show), which identifies the deletion, through the processing of the category editing unit 21a. If the "OK" button is pushed down in the dialog box, the control unit 20 deletes the "business document preparation system" category from the "identifier of category" of the category managing information 30a shown in FIG. 2 through the processing the category-based UI information managing unit 21d. In this instance, three applications allocated to the "business document preparation system" category are released, and the corresponding UI information is discarded.

As a result, the user may add the new category and delete any category. Meanwhile, an interface for changing, for example, the name of the category may be provided.

Further, in the case where the "management of category" window 100 is displayed and the "business document preparation system" category 100a is selected, if the "allocate application" button 100e is operated, the control unit 20 displays the "allocate application" window 110 of the "business document preparation system" category shown in FIG. 3C, through the processing of the application allocating unit 21b. A view of application installed in the computer 10 and check boxes, such as reference numeral 110a, are displayed on the window 110, so that allocation of the category can be performed for every application. In other words, if the user checks an application to be allocated to the "business document preparation system" category, or operates the "OK" button 110b or the "apply" button 110c after excluding the check of an application which is not necessarily allocated to the category, the control unit 20 updates the category managing information 30a shown in FIG. 2 through the processing of the category-based UI information managing unit 21d.

More specifically, the control unit 20 adds an identifier of a new application to the identifier of the application allocated to the "business document preparation system" in the category managing information 30a in FIG. 2. Otherwise, the control unit 20 discards the identifier of the allocated application, and clears the allocation of the application. For example, if the check of "A company-Table calculation application" in the window 110 is excluded by the user, the control unit 20 discards the identifier of the "A company-Table calculation application" corresponding to the "business document preparation system" category of the category managing information 30a in FIG. 2. Therefore, the user can allocate a certain application installed in the computer 10 to a desired category or cancel the allocation. As a result, as described below, the user interface for setting the print condition in a mode corresponding to the category may be displayed.

In the case where the application previously allocated to another category is checked, for example, the dialog box to confirm the cancel of allocation to another category is displayed, the allocation to another category is canceled, and the application is allocated to a category to be allocated at present. Otherwise, the application previously allocated to another category may be grayed out in the "allocate application" window currently displayed, in which the check is not possible.

Further, in the state where the "management of category" window 100 is displayed and the "business document preparation system" category 100a is selected, if the user operates the "change layout" button 100f, the "layout change" window 115 of the "business document preparation system" category shown in FIG. 4A is displayed through the processing of the UI information editing unit 21c. The "layout change" window is a window provided as an interface for allowing the user to change, for example, the layout in the print condition setting window displayed when the printing is instructed from the application belonging to the category. More specifically, the window displays a preview of the print condition setting window, so that the user lays out (e.g., addition, deletion, and movement) the GUI widget corresponding to the print condition setting items, while verifying the preview.

The "print condition setting item" list 115b displayed at the right side of "layout change" window 115 shows various items for setting the print conditions provided by the printer driver 21. For example, there are items such as "select paper size", "select paper type", and so on. In this embodiment, the print condition setting item and the GUI widget representing the item are previously determined. For example, the use of a drop-down list to select the paper size and the use of a check box to select both-sides print are previously determined. Parameters to be displayed in the drop-down list are previously determined in accordance with a type of the printer 43.

For example, the user selects the print condition setting item frequently used when the printing is performed from the application of the "business document preparation system" category among the items enumerated in the "print condition setting item" list 115b, and then drags and drops the selected item at the desired position on the preview region 115a displayed at the left side of the "layout change" window 115, so that the user can perform the layout of the GUI widget of the selected item. Also, for example, if the GUI widget laid out at the preview region 115a is dragged and dropped at the "print condition setting item" list 115b, the GUI widget may not be displayed on the "print condition setting" window. As a result, if the user performs desired edit and then operates the "apply" button or the "OK" button, the UI information 30b is updated through the processing of the category-based UI information managing unit 21d.

More specifically, if the user drags and drops the pint condition setting item of the "select allocation" at the preview region 115a in the window 115, the control unit 20 updates the UI information 30b indicated as "pass to UI information" corresponding to the "business document preparation system" category in the category managing information 30a of FIG. 2. More specifically, for example, the control unit 20 adds to the UI information 30b the information representing inclusion of "select allocation" as the print condition setting item which is displayed on the print condition setting window, and information (coordinates on the basis of the left upper end of the print condition setting window in the preview region 115a) presenting the position of the region 115c including a check box which is the GUI widget corresponding to the "select allocation" and a text of "allocation". In this instance, the pass information to a program module defining action when the GUI widget corresponding to the "select allocation" is operated is added.

The "layout change" window 120 shown in FIG. 4B is a window to be displayed when the user operates the "layout change" button 100f in the state where the "management of category" window 100 is displayed and the "image retouch system" category 100b is selected. As a result, the user may lay out the items so that the items frequently used when performing the printing among the application of the "image retouch system" category are displayed on the "print condition setting" window.

As described above, although the parameters displayed in the drop-down list for the selection of paper size are previously determined, the order of the parameters displayed in the list or a default may be set by the user in accordance with the category. For example, the user may set the parameters in such a way that "A4" is displayed in the "business document preparation system" category as the default parameter of the paper size, and "L type" is displayed in the "image retouch system" category as the default parameter.

With the printer driver 21 according to the invention, the user can change the user interface for setting the print conditions for every category. For this reason, the user can edit the user interface for his or her convenience, for example, by displaying the item more frequently used at a position, size or order which can allow the user to conveniently operate the item as compared with the item less frequently used.

From the above point, the application may be allocated to the category to manage the UI information for every category. If the printing is instructed from the "A company-word processor application" belonging to the "business document preparation system" category, the control unit 20 displays the "print condition setting" window 125 shown in FIG. 5A through the processing of the print condition display control unit 21e. More specifically, if the control unit 20 is received with a printing instruction from the "A company-word processor application", the control unit 20 refers the category managing information 30a in FIG. 2 through the processing of the print condition display control unit 21e, and retrieves the category to which the "A company-word processor application" belongs. The control unit 20 references the UI information 30b corresponding to the "business document preparation system" category based on the "pass to UI information" corresponding to the "business document preparation system" category to which the "A company-word processor application" is allocated, and displays the window 125 on the display 42 based on the UI information 30b. Similarly, if the control unit 20 receives the printing instruction from the "B company-image retouch application" of the "image retouch system" category, the control unit 20 displays the "print condition setting" window 130 shown in FIG. 5B.

If the user operates the GUI widget displayed on the "print condition setting" window, the program module defining the action occurring when the GUI widget is operated is called up. The print condition in accordance with the operation of the user is set by execution of the program module. After the print condition is set, if the print start is instructed from the user, the printer driver 21 generates print data using the image data received from the application based on the print condition, and sends the print data to the printer 43. The printer 43 carries out the printing based on the print condition and the print data.

According to the printer driver 21 of this embodiment, as described above, the user interface for setting the print condition can be displayed in the mode corresponding to the category. For this reason, the usability of the item, of which the frequency in use is different depending upon the category to which the application program belongs, can be improved as compared with a configuration of a prior art which displays the item on the same user interface even though the category is different. Also, with the printer driver 21 according to the embodiment, a different application program belonging to the same category utilizes the same user interface, and in the case of belonging to another category, utilizes other user interface. Therefore, as compared with the configuration which manages the user interface for every application program, it is possible to prevent an amount of information to be managed from being unnecessarily increased, and reduce workloads of the user which are necessary to edit the UI information.

(3) Other Embodiments

The technical scope of the invention is not limited to the above embodiment, and can be modified without departing from the gist of the invention. For example, the layout of the window shown in FIGS. 3 to 5 or the editing method of the user is one example, and is not limited thereto.

The layout recommended by a printer driver vendor is early proposed in the "layout change" window, and the user may select the recommended layout. Also, the edit as described in the above embodiment may be performed on the basis of the recommended layout. Further, when the printing is instructed, the "print condition setting" window displayed by the print condition display control unit 21e may be constituted by a plurality of tabs. The user may intensively display the frequently used items on the tab which is displayed on the top at the initial time.

Further, types of the categories managed by the category-based UI information managing unit 21d may be previously determined by a printer driver vendor. Also, in the case where the application is allocated, the typical application may be previously allocated to the category when the printer driver 21 is installed, or may be automatically allocated to the category when a printer driver is installed. Of course, such application which is allocated by the user and is automatically allocated to the printer driver may be freely changed by the user later.

What is claimed is:

1. A storage medium having a printer driver program recorded thereon causing a computer to execute functions comprising:
   a category-based UI information managing function that manages UI information on a display of a user interface to set a print condition, for every category, to which an application program of a print instruction source belongs;
   a print condition display control function that displays the user interface based on the UI information corresponding to the category, to which the application program of the print instruction source belongs, when printing is instructed;
   a UI information editing function that edits the UI information to be managed for every category; and
   a category editing function that edits the category; and
   an application allocating function that assigns the application program to the category, wherein the application allocating function comprises a list of a plurality of program applications with an indicator showing whether a particular application is allocated to a category,
   wherein when a particular application is already allocated to a first category, allocation to a second category is prohibited.

2. The storage medium according to claim 1, wherein the UI information editing function comprises a plurality of selectable print condition setting items.

3. The storage medium according to claim 1, wherein the UI information editing function comprises a preview region showing a preview of the user interface, including the settings displayed on the user interface.

4. The storage medium according to claim 1, wherein the category editing function comprises a list of registered categories, an add category button, a delete category button, and a change layout button.

5. The storage medium according to claim 1, wherein the UI information editing unit, that edits the UI information to be managed for every category, provides drag and drop functionality to edit the UI information.

6. A storage medium having a printer driver program recorded thereon causing a computer to execute functions comprising:
   a category-based UI information managing function that manages UI information on a display of a user interface to set a print condition, for every category, to which an application program of a print instruction source belongs;
   a print condition display control function that displays the user interface based on the UI information corresponding to the category, to which the application program of the print instruction source belongs, when printing is instructed;
   a UI information editing function that edits the UI information to be managed for every category; and
   a category editing function that edits the category; and
   an application allocating function that assigns the application program to the category, wherein the application allocating function comprises a list of a plurality of program applications with an indicator showing whether a particular application is allocated to a category,
   wherein when a particular application has been previously allocated to a first category, subsequent allocation to a second category can occur after a dialog box is displayed to confirm cancellation of the allocation of the particular application to the first category and to confirm subsequent allocation of the particular application to the second category.

7. The storage medium according to claim 6, wherein the UI information editing function comprises a plurality of selectable print condition setting items.

8. The storage medium according to claim 6, wherein the UI information editing function comprises a preview region showing a preview of the user interface, including the settings displayed on the user interface.

9. The storage medium according to claim 6, wherein the category editing function comprises a list of registered categories, an add category button, a delete category button, and a change layout button.

10. The storage medium according to claim 6, wherein the UI information editing unit, that edits the UI information to be managed for every category, provides drag and drop functionality to edit the UI information.

* * * * *